United States Patent
Sebbah et al.

(10) Patent No.: US 10,296,227 B2
(45) Date of Patent: May 21, 2019

(54) SYSTEM AND METHOD FOR DYNAMIC CACHE DISTRIBUTION FOR IN-MEMORY DATA GRIDS

(71) Applicant: ORACLE INTERNATIONAL CORPORATION, Redwood Shores, CA (US)

(72) Inventors: Samir Sebbah, Medford, MA (US); Claire M. Bagley, Somerville, MA (US); Michael P. Colena, Hollis, NH (US); Gene Gleyzer, Lexington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 492 days.

(21) Appl. No.: 14/829,018

(22) Filed: Aug. 18, 2015

(65) Prior Publication Data

US 2017/0052712 A1   Feb. 23, 2017

(51) Int. Cl.
| | |
|---|---|
| G06F 9/455 | (2018.01) |
| G06F 3/06 | (2006.01) |
| H04L 29/08 | (2006.01) |
| G06F 9/50 | (2006.01) |

(52) U.S. Cl.
CPC ............ *G06F 3/0611* (2013.01); *G06F 3/067* (2013.01); *G06F 3/0655* (2013.01); *G06F 3/0665* (2013.01); *G06F 9/45558* (2013.01); *G06F 9/5077* (2013.01); *H04L 67/1002* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,313,532 B2 | 12/2007 | Mariamova et al. | |
| 7,428,485 B2 * | 9/2008 | Armstrong | G06F 9/4843 |
| | | | 703/21 |
| 7,478,419 B2 | 1/2009 | Anderson et al. | |
| 8,065,255 B2 | 11/2011 | Colena et al. | |
| 8,126,834 B2 | 2/2012 | Chen et al. | |
| 8,165,980 B2 | 4/2012 | Chen et al. | |

(Continued)

OTHER PUBLICATIONS

Cardenas et al. "Uniform Distributed Cache Service for Grid Computing", 2005 IEEE, 5 pages.*

(Continued)

*Primary Examiner* — Van H Nguyen
(74) *Attorney, Agent, or Firm* — Kraguljac Law Group, LLC (57) ABSTRACT

Systems, methods, and other embodiments are disclosed that use constraint programming to dynamically distribute cache throughout a data grid. In one embodiment, modeling logic is configured to generate a constraint programming model based at least in part on a set of constraints that limits assignment of a plurality of data partitions to a plurality of virtual machines hosted on a plurality of physical machines in a data grid. Solver logic is configured to generate at least one solution for assigning the plurality of data partitions to the plurality of virtual machines by operating on the constraint programming model using constraint programming techniques.

19 Claims, 5 Drawing Sheets

(56) References Cited

U.S. PATENT DOCUMENTS

| | | | |
|---|---|---|---|
| 8,165,981 B2 | 4/2012 | Colena et al. | |
| 8,301,582 B2 | 10/2012 | Huberman et al. | |
| 8,447,716 B2 | 5/2013 | Bagley et al. | |
| 8,504,501 B2 | 8/2013 | Colena et al. | |
| 8,645,302 B2 | 2/2014 | Chen et al. | |
| 8,751,425 B2 | 6/2014 | Bagley et al. | |
| 8,768,979 B2* | 7/2014 | Antani | G06F 17/3033 707/809 |
| 8,775,483 B2* | 7/2014 | Antani | G06F 17/3033 707/809 |
| 8,799,893 B2* | 8/2014 | Sethi | G06F 8/63 709/220 |
| 9,361,648 B2* | 6/2016 | Burckart | G06Q 10/0635 |
| 9,600,332 B2* | 3/2017 | Patel | G06F 9/4862 |
| 2010/0095297 A1* | 4/2010 | Sethi | G06F 8/63 718/1 |
| 2010/0274890 A1* | 10/2010 | Patel | G06F 9/4862 709/224 |
| 2014/0089480 A1 | 3/2014 | Zhu | |
| 2015/0067262 A1* | 3/2015 | Uttamchandani | G06F 12/0848 711/129 |
| 2015/0293945 A1* | 10/2015 | Amrhein | G06F 17/30292 707/722 |
| 2016/0086081 A1 | 3/2016 | Lee | |
| 2016/0103695 A1* | 4/2016 | Udupi | G06F 9/45558 718/1 |

OTHER PUBLICATIONS

Hines et al. "MemX: Supporting Large MemoryWorkloads in Xen Virtual Machines", 2007 IEEE, 8 pages.*
WebSphere eXtreme Scale Overview; downloaded on Aug. 10, 2015 from: http://www-01.ibm.com/support/knowledgecenter/SSTVLU_7.1.1/com.ibm.websphere.extremescale.doc/cxsoverview.html; pp. 1-3; IBM Knowledge Center.
John Slaney et al; Constraint Modelling: A Challenge for First Order Automated Reasoning (extended abstract); ; downloaded from: http://ceur-ws.org/Vol-373/invited-3.pdf on Aug. 10, 2015; pp. 1-11.
Frisch et al.; The Rules of Constraint Modelling; downloaded from: http://ijcai.org/papers/1667.pdf on Aug. 10, 2015; pp. 1-8.
Smith et al.; Modelling for Constraint Programming; Sep. 2005; downloaded from: http://www.math.unipd.it/~frossi/cp-school/new-barbara-tutorial.pdf on Aug. 10, 2015; pp. 1-18.
Qureshi et al.; Survey on Grid Resource Allocation Mechanisms; 2014; J Grid Computing; published online Apr. 2, 2014; pp. 1-43.
Abba et al.; Grid Resource Allocation: A Review; published Jun. 30, 2012; Research Journal of Information Technology 4(2): pp. 38-55.
Patni et al.; Load Balancing Strategies for Grid Computing; 2011; downloaded from: http://ieeexplore.ieee.org/xpl/articleDetails.jsp?reload=true&tp=&arnumber=5941745&contentType=Conference+Publications&queryText%3D%28%28grid+computing+%29%29; pp. 1-5.

* cited by examiner

SYSTEM AND METHOD FOR DYNAMIC CACHE DISTRIBUTION FOR IN-MEMORY DATA GRIDS

BACKGROUND

In data grids, in-memory data caching across multiple machines is intended to eliminate performance bottlenecks and minimize data access latency. To address the increasingly sophisticated needs for high data availability and reliable data storage and processing in mission-critical environments, robust and agile applications that provide timely cache distribution decisions and compensate for machine and network failures are desired.

A traditional approach is to attempt to address the dynamic cache distribution for in-memory data grids through the use of heuristics. Different building blocks that constitute the problem (e.g., assignment, load balancing, clustering, and resiliency) have not been used together in modeling and solving any data grid problem. Furthermore, static versions of the problem have been solved in hopes for the eventual correctness of the solution in a dynamic setting. However, when the sizes of the caches change over time (a dynamic aspect of the problem), the solution drastically loses on quality and the approach becomes obsolete.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed for using constraint programming techniques to dynamically distribute partitions of data throughout a data grid in accordance with a specified set of constraints. In one embodiment, a dynamic cache distribution system is an application that finds an assignment of data partitions to caches in a set of machines subject to some constraints defining the cache distribution problem. The constraints that define the cache distribution problem may include, for example, constraints that support resiliency against machine failures (e.g., single and dual machine failures), constraints that support load balancing, constraints that account for storage capacity and processing capacity, constraints that limit the spread of the data storage of customers (i.e., clustering), and constraints that limit data access and latency times. In one embodiment, an assignment strategy is found that minimizes data migration in the data grid while meeting the other constraints.

In accordance with one embodiment, constraint programming (CP) is used to model and solve the cache distribution problem. Constraint programming (CP) is a programming paradigm that uses constraints to express the relations between the variables (e.g., data partitions) of the problem to solve large-scale combinatorial problems. The larger problem of distributing a large set of data partitions throughout machines in a data grid may be decomposed into smaller problems to be solved as represented by compact CP models (sub-models), in accordance with one embodiment. The decomposition method allows very compact CP models to be generated that are solvable within very short time frames (order of milliseconds). The size of the sub-models can be changed to strike different trade-offs between solution size and runtime.

In this manner, efficient and real-time distribution of data partitions can be performed which meet the specified constraints. The distribution is dynamic such that, as states of the distribution change, new solutions are found through the use of constraint programming techniques to re-distribute the data partitions to take into account the new states.

The following terms are used herein with respect to various embodiments.

The term "data partition" as used herein, refers to a group of bytes of data which constitute a portion of a larger group of bytes of data.

The terms "cache", "data cache", "memory cache", and "computer memory cache" are used interchangeably herein and refer to a portion of memory made of, for example, high-speed static RAM (SRAM) which is configured to store data partitions.

The term "machine", as used herein, may refer to a computerized device such as a physical machine hosting one or more virtual machines, or a virtual machine itself.

The term "physical machine", as used herein, refers to a computerized device (having hardware and software) such as, for example, a server computer which is capable of, for example, hosting one or more virtual machines.

The term "virtual machine" (e.g., a Java Virtual Machine (JVM)), as used herein, refers to an implementation of a virtual machine specification that interprets compiled code for a computer's processor (or hardware platform) so that it can perform a program's instructions. For example, Java was designed to allow application programs to be developed that can run on any platform without having to be rewritten or recompiled for each separate platform.

The term "data grid", as used herein, refers to an in-memory data structure that resides entirely in RAM (cache) and is distributed among multiple machines (e.g., server computers).

The terms "solution", "assignment solution", and "distribution solution" are used interchangeably herein and refer to a specific assignment of data partitions to machines in a data grid.

In accordance with one embodiment, the task of distributing data partitions among caches of machines in a data grid is represented as a constraint model. In this representation, the task is specified in terms of a set of variables, each of which can assume values in a given domain, and a set of constraints that the variables must simultaneously satisfy. The set of variables, domains, and constraints is referred to as the constraint model. Each constraint may be expressed as a relation, defined over some subset of the variables, denoting valid combinations of their values. A solution to a constraint model is an assignment of a value to all the variables from their respective domains that satisfies all of the constraints.

A constraint based system includes a constraint solver that attempts to find one or more solutions to a given constraint model, or prove that no solution exists. A constraint solver finds solutions by searching the solution space systematically. Techniques such as back-tracking or branch and bound algorithms may be used. Systematic methods may use a combination of search and inference techniques, for example. Inference techniques employ constraint propagation which propagates information in one constraint to other constraints.

The network of constraints in a constraint model can be viewed as a graph, having a node for each variable and an "arc" for each constraint. The members of each arc are the variables that appear in the constraint to which the arc corresponds. An arc is said to be consistent if, for any variable of the arc and any value in the domain of the variable, there is a valid assignment of values to the other variables on the arc that satisfies the constraint represented by the arc.

Figure 1:
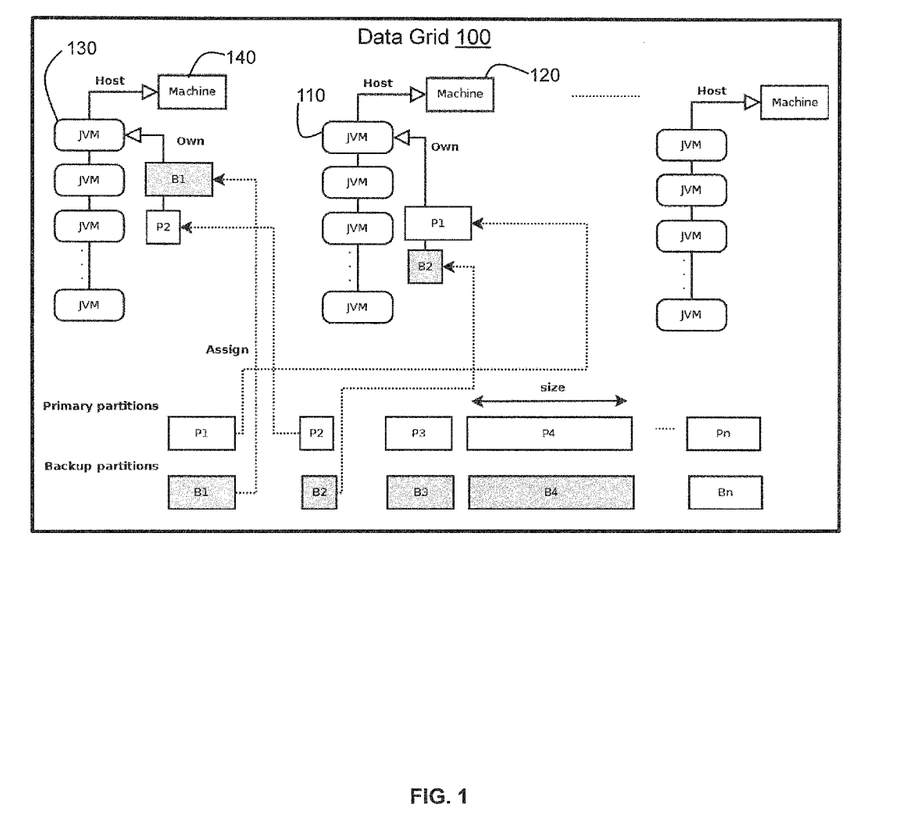
FIG. 1 illustrates one embodiment of a data grid of machines having computer memory cache and allowing for primary and backup partitions of data to be distributed throughout the data grid.

FIG. 1 illustrates one embodiment of a data grid 100 having machines with computer memory cache and allowing for primary and backup partitions of data to be distributed throughout the data grid 100. The data grid 100 includes a cluster of physical machines (e.g., server computers) each hosting a plurality of virtual machines (e.g., Java Virtual Machines or JVM's). Primary partitions of data (P1 to Pn) and backup partitions of data (B1 to Bn) may be assigned to the various JVM's (and associated computer memory cache) using constraint programming techniques. The primary and backup partitions may be of different sizes (megabytes). However, a primary partition and a corresponding backup partition are of the same size. In one embodiment, some primary partitions have no corresponding backup partitions. Some primary partitions may have multiple backup partitions providing more mirrored copies of data and higher resiliency against multiple machine failures. As an example, referring to FIG. 1, data partitions P1 and B2 are assigned to JVM 110 which is hosted on physical machine 120. Similarly, data partitions B1 and P2 are assigned to JVM 130 which is hosted on physical machine 140.

In accordance with one embodiment, a solution for assigning the primary and backup data partitions to cache within the data grid is found using constraint programming techniques. That is, the data partitions are assigned in such a way that a set of constraints are met. The constraints may be related to, for example, resiliency, load balancing, and fan-out grouping (which refers to clustering of data), in accordance with one embodiment.

Resiliency may guarantee survivability against any single machine failure, for example. That is, a system that uses the data grid for cache distribution will continue to function normally even after any machine failure. When a machine does fail, the system switches over to the backup partitions of the affected primary partitions and continues to provide the same service with the same quality. To meet such a resiliency constraint, primary partitions and associated backup partitions are hosted by failure-independent machines. However, primary partitions with no corresponding backup partitions cannot survive machine failures, and primary partitions with multiple backup partitions can survive multiple machine failures.

The term "member", as used herein, refers to a virtual machine (e.g., a JVM). A load may be spread across the virtual machines of a cluster. Physical machines are allowed to have different numbers of members. When all the physical machines host the same number of members, the problem is equivalent to spreading the load across the physical machines. Load balancing may guarantee an even load distribution over the members of the cluster of machines. Load distribution may be related to processing load and/or data load, for example. Load deviation is minimized when, for example, all the virtual machines are equally loaded. With respect to fan-out grouping, the backup partitions of a set of primary partitions assigned to a virtual machine are grouped together and assigned to a cluster of virtual machines of a size that is less than or equal to a defined fan-out group size.

Figure 2:
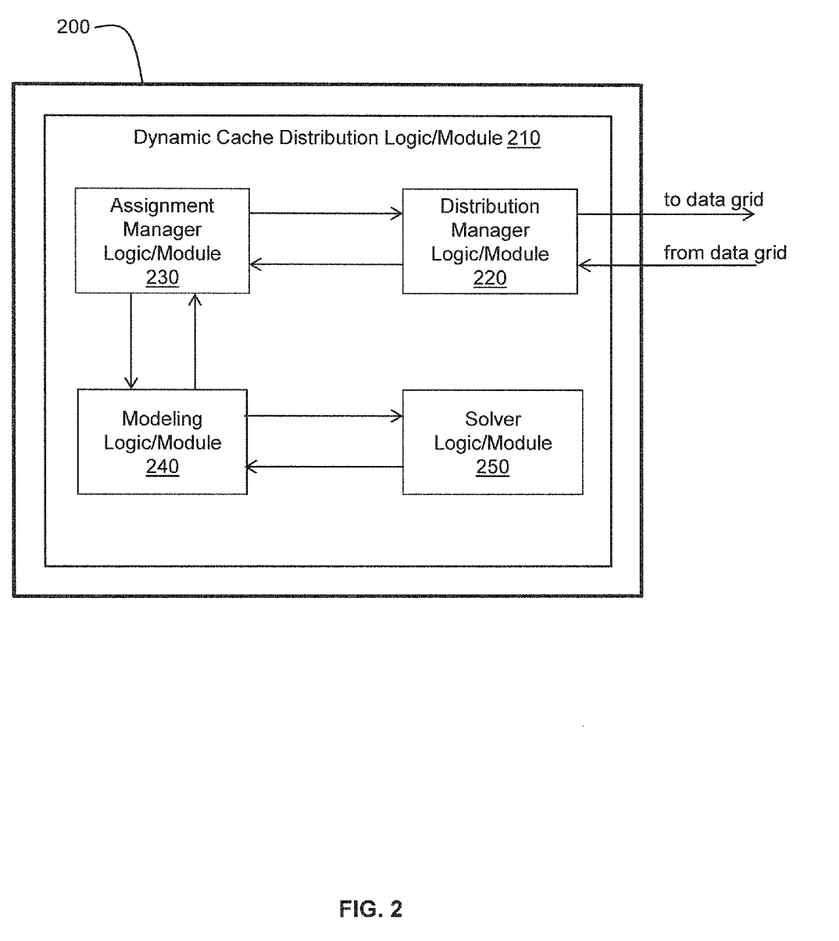
FIG. 2 illustrates one embodiment of a computer system having dynamic cache distribution logic configured to generate solutions to dynamically distribute primary and backup data partitions throughout the data grid of FIG. 1.

FIG. 2 illustrates one embodiment of a computer system 200 having dynamic cache distribution logic 210 configured to generate solutions to dynamically distribute primary and backup data partitions throughout the data grid 100 of FIG. 1. The computer system 200 may be a server computer, in accordance with one embodiment, that operates in cooperation with a computerized service (e.g., an enterprise management system or an on-line retail system) to distribute data partitions associated with the computerized service throughout the data grid 100.

In one embodiment, the system 200 is a computing/data processing system including an application or collection of distributed applications for enterprise organizations. The applications and computing system 200 may be configured to operate with or be implemented as a cloud-based networking system, a software-as-a-service (SaaS) architecture, or other type of computing solution.

With reference to FIG. 2, in one embodiment, dynamic cache distribution logic 210 is implemented on the computer system 200 and includes logics for implementing various functional aspects of dynamic cache distribution logic 210. In one embodiment, dynamic cache distribution logic 210 includes distribution manager logic 220 (e.g., a distribution manager module), assignment manager logic 230 (e.g., an assignment manager module), modeling logic 240 (e.g., a modeling module), and solver logic 250 (e.g., a solver module).

Other embodiments may provide different logics or combinations of logics that provide the same or similar functionality as the computer system 200 of FIG. 2. For example, in one embodiment, dynamic cache distribution logic 210 is an executable application including algorithms and/or program modules configured to perform the functions of the logics. The application is stored in a non-transitory computer storage medium. That is, in one embodiment, the logics of dynamic cache distribution logic 210 are implemented as modules of computer-executable instructions stored on a computer-readable medium. The instructions are executable by a processor of the computer system to perform the functions described herein.

In one embodiment, modeling logic 240 is configured to generate a constraint programming (CP) model based at least in part on a set of constraints that limits assignment of a plurality of data partitions to a plurality of virtual machines hosted on a plurality of physical machines in a data grid. The virtual machines are associated with data caches for storing the data partitions. The CP model includes a set of variables, a set of values, and the set of constraints, and is elaborated on later herein.

In one embodiment, solver logic 250 is configured to generate at least one solution for assigning the plurality of data partitions to the plurality of virtual machines by operating on the CP model using constraint programming techniques. The constraint programming techniques may include a search strategy that searches through a solution space representing the data grid. The search strategy may employ, for example, back-tracking and/or branch and bound techniques. Other CP techniques are possible as well, in accordance with other embodiments.

Modeling logic 240 generates the CP model based at least in part on a set of variables and a set of values. The set of values represent the plurality of virtual machines hosted on the plurality of physical machines in the data grid. The set of variables represent the data partitions. The set of variables can take on the set of values, as limited by the set of constraints, in response to solver logic 250 operating on the CP model using the constraint programming techniques. That is, the data partitions can be assigned to the virtual machines (and associated data cache) such that the set of constraints are met, assuming such a solution exists.

In one embodiment, distribution manager logic 220 is configured to generate an analysis by analyzing the solution generated by solver logic 250, and make a decision as to whether to implement the solution in the data grid based on the analysis. For example, the analysis may show that all of the data partitions have been assigned and that the solution satisfies all of the constraints of the CP model. As a result, distribution manager logic 220 may decide to proceed with directing the distribution of the data partitions throughout the data grid in accordance with the solution.

As another example, the analysis may show that the solution satisfies all of the constraints of the CP model. However, the analysis may also indicate that the state of the data grid is likely to change very soon. Therefore, distribution manager logic 220 may decide to wait a few seconds, gather information corresponding to a present state of the data grid, and then allow another updated solution to be generated.

In one embodiment, distribution manager logic 220 is also configured to monitor the data grid for information associated with present states of a present distribution of the data partitions among the virtual machines hosted on the physical machines. The information associated with the present states may include, for example, information associated with unbalanced processing loads and/or data loads among the plurality of physical machines in the data grid, and information associated with a physical machine leaving or joining the cluster of physical machines in the data grid.

In one embodiment, assignment manager logic 230 is configured to generate an analysis by analyzing the information associated with the present states of the present distribution of the data partitions among the virtual machines hosted on the physical machines. The set of constraints is generated by assignment manager logic 230 based at least in part on results of the analysis. In one embodiment, distribution manager logic 220 is responsible for maintaining state information and providing the necessary information for a self-balancing assignment strategy (e.g., provided by assignment manager logic 230) to make distribution decisions.

For example, the analysis generated by assignment manager logic 230 may indicate that certain virtual machines in the data grid are over-loaded with heavy load and certain other virtual machines in the data grid are under-loaded. In such an unbalanced load scenario, a new set of constraints may be generated by assignment manager logic 230, and a new CP constraint model may be generated by modeling logic 240 based on the results of the analysis and the new set of constraints. The new CP model can be solved by solver logic 250 and the new solution can be implemented by distribution manager logic 220 to alleviate the imbalance.

In this manner, a computing system can be configured to generate solutions for distributing data partitions throughout a data grid based on constraints and constraint programming techniques in a dynamic way. States of the data grid can be monitored and, as states change, the computing system can dynamically generate new CP models and solutions to those models. The computing system can further be configured to implement a solution in response to analyzing the solution and deciding to implement the solution based on one or more criterion.

Figure 3:
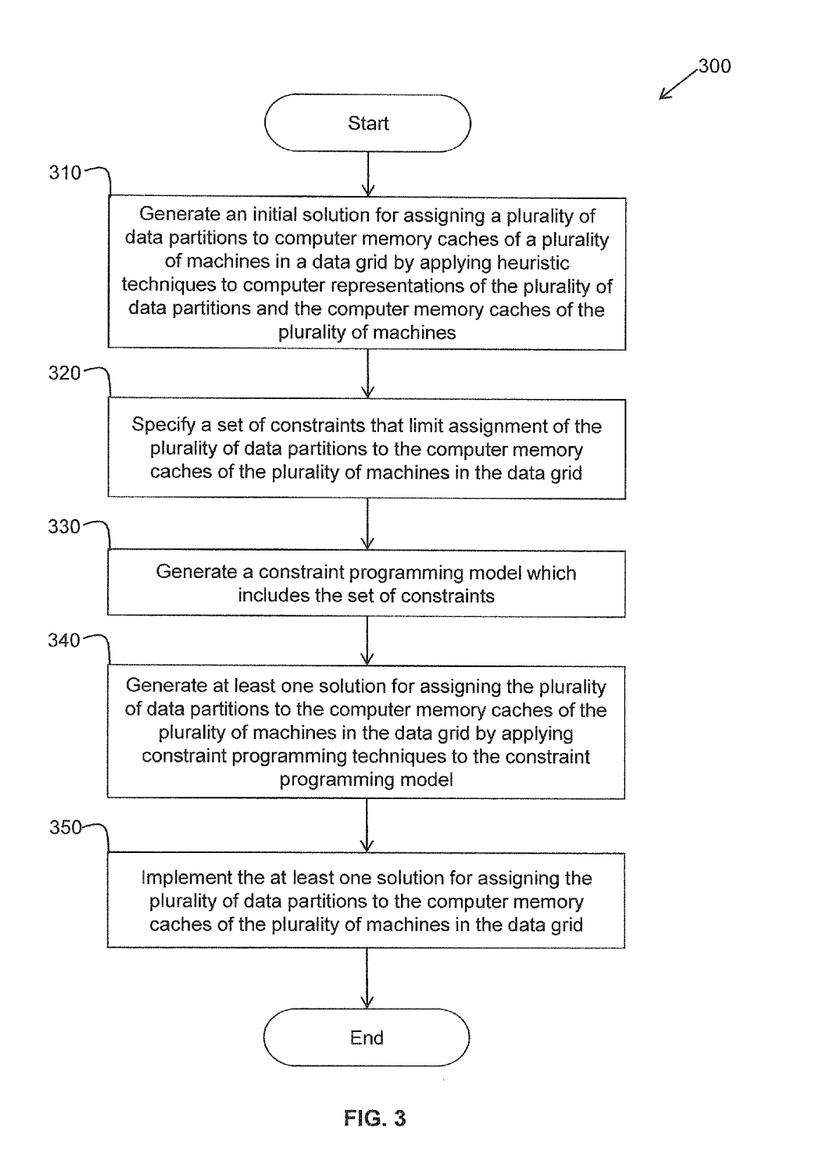
FIG. 3 illustrates one embodiment of a method, which can be performed by dynamic cache distribution logic of the computer system of FIG. 2, to dynamically distribute primary and backup data partitions throughout the data grid of FIG. 1.

FIG. 3 illustrates one embodiment of a method 300, which can be performed by dynamic cache distribution logic 210 of the computer system 200 of FIG. 2, to dynamically distribute primary and backup data partitions throughout the data grid 100 of FIG. 1. Method 300 describes operation of dynamic cache distribution logic 210 and is implemented to be performed by the computing system 200 of FIG. 2, or by another computing device configured with algorithms of the method 300. For example, in one embodiment, method 300 is implemented by a computing device configured to execute a computer application by using at least a processor. The computer application is configured to process data in electronic form and includes stored executable instructions that perform the functions of at least the method 300 and/or its equivalents.

Method 300 will be described from the perspective that defined partitions of data are to be distributed throughout computer memory caches of a data grid such that the resultant distribution complies with a set of constraints. Constraint programming techniques are used to find a final solution to the distribution problem which satisfies the constraints. The data partitions may include both primary and backup data partitions. Furthermore, one or more of the constraints may be related to how the backup data partitions are to be distributed with respect to the primary data partitions.

Upon initiating method 300, at block 310, an initial heuristic solution is generated for assigning a plurality of data partitions to computer memory caches of a plurality of machines in a data grid. The initial heuristic solution is generated by applying heuristic techniques to computer representations of the plurality of data partitions and the computer memory caches of the plurality of machines. A heuristic search technique, for example, is a technique designed for searching a solution space more quickly when other methods are too slow, or for finding an approximate solution when other methods fail to find any exact solution.

A heuristic technique may trade optimality, completeness, accuracy, or precision for speed. A heuristic technique can often be considered a shortcut to arrive at a "ball park" solution. The "ball park" solution may subsequently be refined to arrive at a more exact solution which, for example, satisfies a set of constraints. In accordance with one embodiment, the initial heuristic solution is generated by solver logic 250 of FIG. 2.

The initial heuristic solution may be implemented by distribution manager logic 220 of FIG. 2, in one embodiment, to initially distribute the data partitions in the data grid (i.e., store data associated with the data partitions in the computer memory caches of the machines). In another embodiment, block 310 may not be performed. Instead, constraint programming techniques may be solely relied upon to generate a cache distribution solution.

For example, at block 320, a set of constraints is specified. The set of constraints may be specified in a data structure of dynamic cache distribution logic 210 of FIG. 2, for example. The set of constraints limit assignment possibilities of the plurality of data partitions to the computer memory caches of the plurality of machines in the data grid. In one embodiment, the set of constraints is specified by assignment manager logic 230 of FIG. 2.

In accordance with one embodiment, the set of constraints is related to ensuring that primary data partitions and corresponding backup data partitions of the plurality of data partitions are assigned to different machines of the plurality of machines (e.g., to different physical machines). In this manner, if a machine fails that has computer cache memory associated with a particular primary data partition, the corresponding backup data partition is guaranteed to be with another machine and, therefore, be accessible. The set of constraints may also be related to balancing data and processing loads among the plurality of machines, limiting data access and latency times, and providing resiliency against single-machine and/or dual-machine failures.

At block 330, a constraint programming (CP) model is generated which includes the set of constraints in another data structure. The CP model also includes a set of variables representing the data partitions, and a set of values representing the plurality of virtual machines. The set of variables can take on the set of values, as limited by the set of constraints, in response to applying constraint programming techniques to the CP model. In accordance with one embodiment, the CP model is generated by modeling logic 240 of FIG. 2.

At block 340, a CP solution (e.g., an update to the initial heuristic solution, or an entirely new solution) is generated, in another data structure, for assigning the plurality of data partitions to the computer memory caches of the plurality of machines in the data grid. Constraint programming techniques are applied to the CP model to generate the CP solution. Furthermore, the constraint programming techniques may take into account the initial heuristic solution (e.g., if the data partitions were initially distributed in accordance with the initial heuristic solution). In accordance with one embodiment, the CP solution is generated by solver logic 250 of FIG. 2.

At block 350, the CP solution for assigning the data partitions to the caches of the machines of the data grid is implemented. That is, the data associated with the data partitions (both primary and backup) are moved to and stored in the computer memory caches of the machines of the data grid to which they have been assigned by the CP solution. In accordance with one embodiment, implementation of the CP solution is performed by distribution manager logic 220 of FIG. 2.

In accordance with one embodiment, the data grid may be monitored for unbalanced data loads and processing loads among the plurality of machines. Furthermore, the data grid may be monitored for machines leaving or joining the cluster of machines in the data grid. The monitoring is performed by distribution manager logic 220 of FIG. 2, in one embodiment.

To reduce the solution space and make finding a solution more efficient, the CP model may be transformed or decomposed into a plurality of CP sub-models in a plurality of data structures. Each CP sub-model may include a subset of the set of variables representing the data partitions, and a subset of the set of values representing the plurality of virtual machines. Therefore, each CP sub-model has a reduced solution space.

Furthermore, each CP sub-model may have a subset of constraints. The subset of constraints associated with each CP sub-model may be the same, or may be tailored specifically to each CP sub-model, in accordance with various embodiments. For example, one CP sub-model may have a subset of constraints that focus on load balancing. Another CP sub-model may have a subset of constraints that focus on data access and latency times as well as resiliency against single-machine and/or dual-machine failures. A subset of constraints may be derived from an original set of constraints for the entire data grid, for example. In accordance with one embodiment, decomposition of the CP model into CP sub-models is accomplished by modeling logic 240 of FIG. 2.

A solution for each CP sub-model may be generated by applying constraint programming techniques to each CP sub-model, where each solution assigns a set of values representing a corresponding subset of virtual machines to a set of variables representing a corresponding subset of data partitions. In accordance with one embodiment, each CP sub-model may be solved sequentially by solver logic 250 of FIG. 2 to generate a separate CP solution for each CP sub-model. In accordance with another embodiment, dynamic cache distribution logic 210 may include a plurality of solver logics 250 (i.e., one solver logic for each CP sub-model), and the solutions for the CP sub-models may be generated and solved in parallel.

In this manner, data partitions may be distributed throughout a data grid while satisfying a set of constraints. Constraint programming techniques ensure that the set of constraints are satisfied by the distribution solution. The total distribution problem can be decomposed into sub-problems and modeled as CP sub-models to more easily and more efficiently arrive at a distribution solution.

Figure 4:
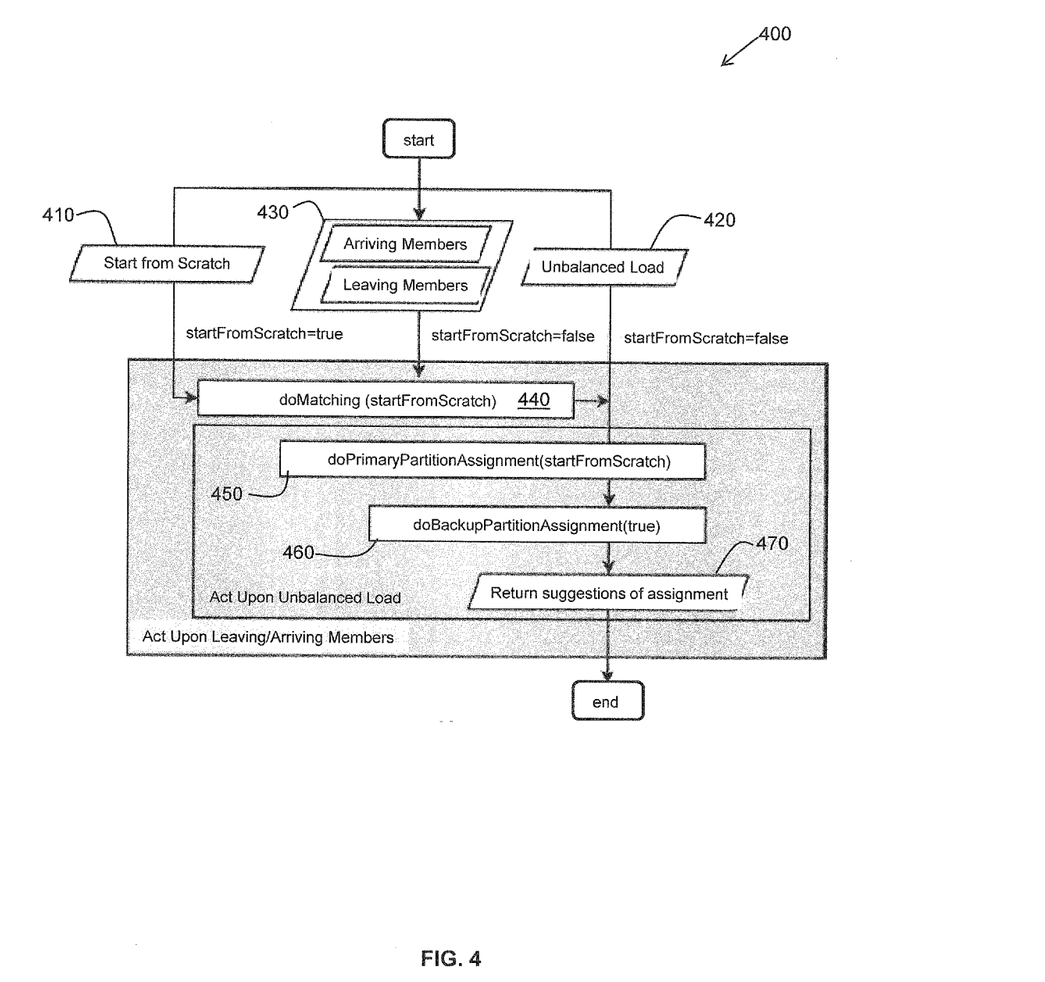
FIG. 4 illustrates another embodiment of a method, which can be performed by dynamic cache distribution logic of the computer system of FIG. 2, to dynamically distribute primary and backup data partitions throughout the data grid of FIG. 1.

FIG. 4 illustrates another embodiment of a method 400, which can be performed by dynamic cache distribution logic 210 of the computer system 200 of FIG. 2, to dynamically distribute primary and backup data partitions throughout the data grid 100 of FIG. 1. Method 400 describes operation of dynamic cache distribution logic 210 and is implemented to be performed by the computing system 200 of FIG. 2, or by another computing device configured with algorithms of the method 400. For example, in one embodiment, method 400 is implemented by a computing device configured to execute a computer application by using at least a processor. The computer application is configured to process data in electronic form and includes stored executable instructions that perform the functions of at least the method 400 and/or its equivalents.

Method 400 will be described from the perspective that defined partitions of data are to be distributed throughout computer memory caches of a data grid such that the resultant distribution complies with a set of constraints. Constraint programming techniques are used to find a final solution to the distribution problem which satisfies the constraints. The data partitions may include both primary and backup data partitions. Furthermore, one or more of the constraints may be related to how the backup data partitions are to be distributed with respect to the primary data partitions.

Method 400 may start by following one of three different paths, depending on a present state of the data grid. In one embodiment, the present state of the data grid is monitored by distribution manager logic 220 of dynamic cache distribution logic 210 of FIG. 2. If none of the data partitions to be distributed have been distributed in any manner yet (e.g., by heuristics), then method 400 will start at block 410 (start from scratch). If the data partitions have been previously distributed but it is determined that an unbalanced load state exists within the present distribution, then method 400 will start at block 420 (unbalanced load). An unbalanced load can occur due to the dynamicity of the caches (cache size can change over time). The caching of new data and the migration of existing caches can easily create unbalanced load distribution across the members of the cluster (data grid). If the data partitions have been previously distributed but it is determined that a new virtual machine has joined the data grid (arriving member) or a virtual machine has left the data grid (leaving member), then method 400 will start at block 430. For example, virtual machines may be added to the data grid to scale up available resources. Virtual machines may leave the data grid when a physical machine upon which the virtual machines are hosted is taken off-line for maintenance, for example.

If the method 400 starts at block 410 or block 430, the method proceeds to block 440. If the method 400 starts at block 420, the method 400 proceeds to block 450. At block 440, a combination of a heuristic and CP technique are used to match failure-independent virtual machines. The heuristic is used, if the flag "start from scratch" is true, to find a feasible matching map without regards to the matching load balance. The CP technique is used to improve the matching load balancing of the matching map found by the heuristic. The matching process simplifies the backup data partition assignment problem as it is a symmetrical problem of the primary data partition assignment problem. In the case where there are no backup data partitions, the matching process of block 440 is not performed. In one embodiment, the matching process is performed by assignment manager logic 230 of dynamic cache distribution logic 210 of FIG. 2.

At block 450, a combination of a heuristic and CP technique are used to assign the primary data partitions to memory cache of the machines in the data grid. The heuristic is used, if the flag "start from scratch" is true, to find a feasible assignment without regards to load balancing. The CP technique is used to improve the primary data assignment load balancing of the solution found by the heuristic (if the heuristic is not used, then improve the load balancing of the existing assignment).

At block 460, a combination of a heuristic and CP techniques are used to assign the backup data partitions to memory cache of the machines in the data grid. The heuristic uses the matching map built in 440 to find a feasible backup partition assignment, the CP technique is used to improve the backup data assignment load balancing of the solution found by spreading the backup loads through limited members of clusters. The spread of the load is done in a way that does not violate the clustering constraint.

Again, the matching process at block 440 ensures that corresponding primary and backup data partitions are assigned to failure-independent virtual machines. In one embodiment, the primary and backup data partitions are assigned at blocks 450 and 460, respectively, by solver logic 250 of dynamic cache distribution logic 210 of FIG. 2.

For example, referring to the data grid 100 of FIG. 1, primary data partition P1 is shown as being assigned to memory cache associated with JVM 110 hosted on physical machine 120. The corresponding backup data partition B1 is shown as being assigned to memory cache associated with JVM 130 hosted on physical machine 140. Similarly, primary data partition P2 is shown as being assigned to memory cache associated with JVM 130 hosted on physical machine 140, and the corresponding backup data partition B2 is shown as being assigned to memory cache associated with JVM 110 hosted on physical machine 120.

At block 470, suggested assignment solutions are returned for consideration for implementation. For example, in one embodiment, suggested assignment solutions are returned from solver logic 250 to distribution manager logic 220 of dynamic cache distribution logic 210 of FIG. 2. In another embodiment, suggested assignment solutions are returned from solver logic 250 to assignment manager logic 230, which returns the suggestions to distribution manager 220.

In one embodiment, blocks 450 and 460 each include two assignment operations being that of a heuristic assignment operation and a CP assignment operation. The heuristic assignment operation is performed first to quickly find a valid assignment solution. The CP assignment operation is performed next, based on a CP model and the initial valid assignment solution, to satisfy a set of constraints. In accordance with one embodiment, both the heuristic assignment operation and the CP assignment operation are performed by solver logic 250 of dynamic cache distribution logic 210 of FIG. 2.

In this manner, a present state of the data grid can be taken into account before proceeding with updating an assignment solution for distributing the data partitions. Primary and backup data partitions are matched to ensure that a resulting assignment solution provides resiliency against machine failures. Members arriving or leaving the data grid are also taken into account.

A Data Model Embodiment for Constraint Programming

In one or more embodiments, constraints include restrictions on how data partitions may be assigned to members (e.g., virtual machines). In an example, a constraint limits an assignment of one or more data partitions to a member. A set of constraints may involve one or more members and partitions.

In an embodiment, a constraint defines a maximum data load of a member in terms of amount of data cache. In one example, a constraint corresponds to a load constraint. The size constraint defines a maximum size of data partitions (e.g., in terms of megabytes of data) that may be assigned to a member. A data partition may be assigned to a particular member depending on how many megabytes are currently assigned to the particular member. In an example, a first member may be able to concurrently handle a maximum load from one thousand data partitions each of a certain size. Furthermore, a second member may be able to concurrently handle a maximum load of three thousand data partitions, each of the same certain size.

In one or more embodiments, a data model (a CP model) refers to a particular organization, structure, or representation of information. A data model may be a format in which information is communicated within an information system. In an example, a data model may be generated by modeling logic 240 based on data partitions, members, and member capabilities or attributes, and/or constraints. The data model may then be input to solver logic 250 for assigning data partitions to members.

In one embodiment, the data model includes one or more data model elements such as data partition elements and size elements. Data partition elements represent data partitions. Each data partition element is associated with a data partition domain. A data partition domain, corresponding to a particular data partition, includes a set of possible members to which a particular data partition may be assigned. While the potential assignments may include all or a subset, the final assignment will be a data partition to a single member.

In an example, each data partition domain includes a candidate set of members, filtered from a full set of members, to which a particular data partition may be assigned based on member capabilities required and/or preferred for caching of the particular data partition. A candidate set of members may include each member that possesses the member capabilities required for caching of the particular data partition. Alternatively, a candidate set of members may include each member that possesses both the member capabilities required for caching of the particular data partition and the member capabilities preferred for caching of the particular data partition.

In one embodiment, member elements may be included in the data model. Member elements may represent members. Each member element may be associated with a member domain. A member domain, corresponding to a particular member, may include a set of possible data partitions that may be assigned to the particular member. A member domain may include all or a subset of data partitions.

In one embodiment, size elements represent the current sizes of data partitions assigned to a virtual machine. Each size element is associated with a size domain. A set of possible values for a size element is specified by the size domain. In an example, a constraint identifies a maximum size (e.g., number of megabytes) that may be concurrently assigned to a particular member. Based on the constraint, a size domain is determined. In one embodiment, the size domain for the particular member is a set of sequential integer numbers running from zero to N (e.g., zero to 1023), where each integer number represents a same number of megabytes. Each time a data partition (being less than or equal to the number of megabytes) is assigned to the particular member, the size element is incremented, accounting for the size of the partition being assigned, using the size domain.

In one embodiment, the data model is a software data structure. The software data structure is readable by a machine. The software data structure is an input to hardware and/or software configured to assign data partitions to members such as solver logic 250. The data model elements (such as data partition elements and size elements) are data structure elements within a software data structure. Data partition elements are stored in one or more data structure elements. Size elements are stored in one or more data structure elements. Data partition elements may be stored in a same or different data structure element that stores the size elements. In an example, a data structure element may be an array. An array corresponds to a data model element, and elements of the array correspond to the domain of the data model element. Other examples of data structure elements include vectors, linked lists, tables, and/or other software data objects.

In one embodiment, sort/search algorithms are applied with the data model to solver logic 250. Sort/search algorithms may include sort algorithms, search algorithms, or both. Sort/search algorithms direct solver logic 250 to arrive at a preferred solution or to achieve a specified goal. A preferred solution or specified goal is context specific. A goal may be, for example, to assign high priority data partitions before low priority data partitions. Another goal may be, for example, to assign to members with high levels of processing capability before assigning to members with lower levels of processing capability. Another goal may be, for example, to achieve load balancing across members, that is, to distribute data partitions to members in a balanced manner. In an example, sort/search algorithms may be configured to process a particular data partition, before other data partitions, based on an attribute of the particular data partition. In another example, sort/search algorithms may be configured to assign a particular data partition to a particular data member, rather than another data partition, based on an attribute of the particular member.

Example operations performed by sort/search algorithms include:
sorting available data partitions by priority level or other parameter,
selecting a first data partition in a sorted list of data partitions for processing,
filtering members to find a candidate set of members that possess both member capabilities required for caching of the data partition and member capabilities preferred for caching of the data partitions, and
selecting a next data partition in the sorted list of data partitions for processing.

In one embodiment, each sort/search algorithm is associated with a unique identifier. The identifier may be used to specify a particular sort/search algorithm as an input parameter to solver logic 250. In one embodiment, solver logic 250 may be configured to apply constraint programming algorithms that are well-known in the art, such as backtracking and forward checking.

Elaborations on Particular Embodiments of Modules and Algorithms

In one embodiment, a distribution manager module 220 is responsible for maintaining state information and providing the necessary information for a self-balancing assignment strategy (e.g., provided by the assignment manager module 230) to make distribution decisions. The distribution manager module 220 is also responsible for collecting and enacting formulated assignment suggestions by the self-balancing assignment strategy. For example, in one embodiment, the assignment manager module 230 accesses current state information from the distribution manager module 220 through an application programming interface (API) using a method to return suggestions. A procedure invokes the method to return suggestions on the API.

In one embodiment, various API's are provided. A first API supports returning a set of partitions for which a specified member owns a specified storage index. A second API supports returning a set of ownership-enabled members in a partitioned service which are in the process of leaving the data grid. A third API supports returning a set of ownership-enabled members in the partitioned service. A fourth API supports returning ownership information for a specified partition. A fifth API supports returning the partitioned service for which the distribution manager module 220 coordinates the distribution. Also, a sixth API supports suggesting a distribution change for a specified set of partitions, indicating either primary transfer, backup transfer, or both.

The self-balancing assignment strategy performs tasks that include analyzing distributions, building decision problems, building solver models, providing solver specifications, gathering solver solutions, and returning suggestions of assignments. In one embodiment, the tasks are ordered according to the flow of information that flows from the distribution manager module 220, to the solver module 250, through the self-balancing assignment strategy, and back to the distribution manager module 220.

In one embodiment, a decomposition method iteratively repeats a set of actions a number of times to build and solve a CP-based sub-model. The solving of the sub-model may interrupt the assignment process if a load balancing condition is met. In building a sub-model, an assignment type parameter is used to decide on the model to build. The search for a globally balanced solution is achieved iteratively by solving small CP models (sub-models). The coordination of the balancing process is done in the decomposition method.

In the case where the assignment is of type "primary", a pair (or pairs) of members is (are) selected with the highest shifted primary load (i.e., the members with the furthest load from the average value, which are the most loaded and the least loaded members). A list of partitions is constructed which are owned by the selected members. A CP-based decision problem is built with the set of selected members and partitions.

In the case where the assignment is of type "backup", a pair of members with the highest shifted backup load from a cluster of members is selected. The cluster members are selected from all the clusters with unbalanced backup load. A list of partitions owned by the selected members is constructed, and a CP-based decision problem is built with the set of selected members and partitions.

In the case where the assignment is of type "matching", a pair of members with the highest shifted matching load is selected (i.e., the members with the furthest matching load from the average value, which are the most matching loaded and the least matching loaded members). A list of source members that are matched to the destination members is constructed, and a CP-based decision problem is built with the set of selected source/destination members. This is a matching decomposition method.

With respect to solving a CP-based decision problem (i.e., a CP sub-model), a deviation value of a distribution (number of owned partitions or matched members) is computed. If the value is below a threshold (e.g., 2%) then the solve process is interrupted and a message is returned (e.g., "Good balance, no need for further solve"). Otherwise, the CP-based decision problem is solved to re-balance the loads of the members. Furthermore, internal solution data structures may be updated (either the primary/backup assignments for the groups matching). Finally, a message may be sent indicating to continue with the solve process.

In one embodiment, heuristic primary partition assignment is performed to quickly find a feasible assignment of the primary partitions regardless of the deviation of the loads. Therefore, the sizes of the partitions are not taken into consideration. The partitions may be assigned to the members from left to right (identity order), then from right to left in a round-robin manner. For example, iterations may be performed over the partitions to assign to the members. Members are considered from left to right, partitions are assigned, and the solution is updated. Next, members are considered from right to left, partitions are assigned, and the solution is updated.

In one embodiment, heuristic matching is performed to quickly find a feasible matching of failure-independent members. Members that are owned by a machine are matched to members from another machine in a round-robin manner. A list of members is constructed, ordered by decreasing order of host machine size (i.e., members of the biggest machines that own more members come first). The next destination matching member is set to the first member on the next biggest machine. Iterations are performed over all the members to find the next failure-independent member with the current source member to match to it. The search for the next member to match the source member is performed in a round-robin manner.

In one embodiment, heuristic backup partition assignment is performed to quickly find a backup partition owner for all partitions based on a matching map. The matching map is built by the matching manager that uses the matching heuristic and the CP matching model. Members owned by a machine are matched to members from another machine in a round-robin manner. Iterations are performed over all the members (source members) to find matching destinations and owned sets of partitions. The backup partitions of the owned primary partitions are assigned to the matching destinations of the source members.

In one embodiment, backup partition assignment methods operate on clusters of small members that share the same risk of machine failure. The size of each cluster of members is defined by a fan-out-grouping parameter. Sizes of clusters that are less than or equal to a fan-out-grouping parameter value are constructed. Each cluster, called a matching source cluster, is later associated with a matching destination cluster that will hold all of the backup partitions owned by the members of the matching source cluster. Sizes of clusters that are greater than the fan-out-grouping parameter value are broken up into multiple clusters that are then added to a list of members that share the same risk of machine failure.

In one embodiment, a constraint programming module creates input specifications including variables, constraints, and other solver routines. In the constraint programming module, a clear separation is made between the modeling and solving parts of the CP model. In one embodiment, the constraint programming module provides a high level specification of the different CP algorithms for partition assignment. The entry point of the constraint programming module calls routines to create the variables, create the constraints, and define a strategy for guiding the search.

In accordance with one embodiment, load variables and partition assignment variables are created. Furthermore, constraints are created which include a bin-packing constraint for assignment and a deviation constraint for the controlled minimization of the load distribution. A solution guide is also created to discriminate among equivalent solutions. In one embodiment, preference is given to solutions that incur less load migration.

Systems, methods, and other embodiments have been described that are configured to dynamically distribute cache throughout a data grid using constraint programming techniques. In one embodiment, a set of constraints is specified, in a first data structure, which limits assignment of a plurality of data partitions to computer memory caches of a plurality of machines in a data grid. A constraint programming model is generated, in a second data structure, which includes the set of constraints. At least one solution is generated, in a third data structure, for assigning the plurality of data partitions to the computer memory caches of the plurality of machines in the data grid by applying constraint programming techniques to the constraint programming model.

Computing Device Embodiment

Figure 5:
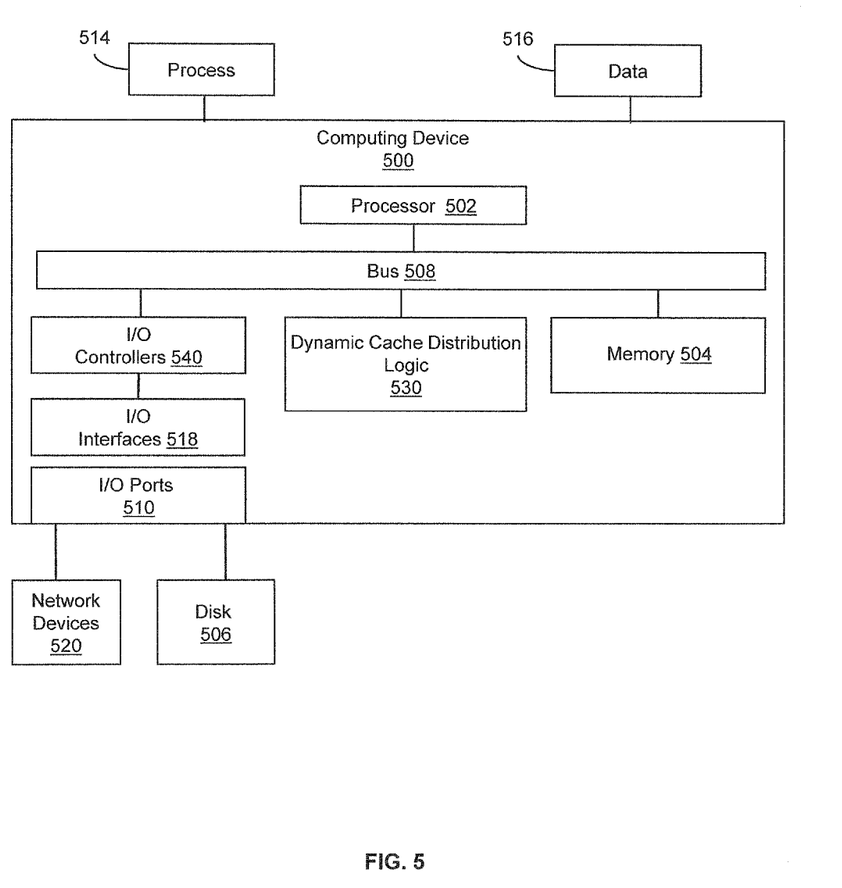
FIG. 5 illustrates one embodiment of a computing device upon which dynamic cache distribution logic may be implemented.

FIG. 5 illustrates an example of a computing device that is configured and/or programmed with one or more of the example systems and methods described herein, and/or equivalents. FIG. 5 illustrates one example embodiment of a computing device 500 upon which an embodiment of dynamic cache distribution logic may be implemented. The example computing device includes a processor 502, a memory 504, and input/output ports 510 operably connected by a bus 508.

In one example, the computing device 500 may include dynamic cache distribution logic 530 (corresponding to dynamic cache distribution logic/module 210 from FIG. 2) configured with a programmed algorithm as disclosed herein that applies constraint programming techniques to dynamically assign data partitions across a plurality of virtual machines in a data grid. In different examples, the logic 530 may be implemented in hardware, a non-transitory computer-readable medium with stored instructions, firmware, and/or combinations thereof. While the logic 530 is illustrated as a hardware component attached to the bus 508, it is to be appreciated that in other embodiments, the logic 530 could be implemented in the processor 502, a module stored in memory 504, or a module stored in disk 506.

In one embodiment, logic 530 or the computing device 500 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the dynamic distribution of data partitions across a plurality of virtual machines in a data grid using constraint programming techniques. The means may also be implemented as stored computer executable instructions that are presented to computing device 500 as data 516 that are temporarily stored in memory 504 and then executed by processor 502.

Logic 530 may also provide means (e.g., hardware, non-transitory computer-readable medium that stores executable instructions, firmware) for facilitating the dynamic distribution of data partitions across a plurality of virtual machines in a data grid using constraint programming techniques.

Generally describing an example configuration of the computing device 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected (wired or wirelessly) to the computing device 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computing device 500.

The computing device 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computing device 500 can operate in a network environment and thus may be connected to the network devices 520 via the i/o interfaces 518, and/or the i/o ports 510. Through the network devices 520, the computing device 500 may interact with a network. Through the network, the computing device 500 may be logically connected to remote computers. Networks with which the computing device 500 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.

RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:
1. A method implemented by a computing device, the method comprising:
  specifying a set of constraints in a first data structure, wherein the set of constraints comprises a plurality of individual constraints that: (i) limit assignment of a plurality of data partitions to computer memory caches allocated to a plurality of virtual machines in a data grid, and (ii) express one or more relationships between the plurality of data partitions;
  generating a constraint programming model, which includes the set of constraints, in a second data structure; and
  generating at least one solution, in a third data structure, for assigning the plurality of data partitions to the computer memory caches allocated to the plurality of virtual machines in the data grid by applying, by at least one processor of the computing device, constraint programming techniques to the constraint programming model, wherein the at least one solution comprises assignments of the plurality of data partitions to the computer memory caches allocated to the plurality of virtual machines that simultaneously satisfies each of the individual constraints to: (i) balance a data load among the plurality of virtual machines by balancing quantities of data associated with the data partitions assigned to the computer memory caches allocated to the plurality of virtual machines, and (ii) balance a processing load among the plurality of virtual machines.

2. A computer system, comprising:
at least one processor connected to at least one memory;
a modeling module stored on a non-transitory computer readable medium and including instructions that, when executed by the at least one processor, cause the computing system to generate a constraint programming model based at least in part on a set of constraints, wherein the set of constraints comprises a plurality of individual constraints that: (i) limit assignment of a plurality of data partitions to computer memory caches allocated to a plurality of virtual machines hosted on a plurality of physical machines in a data grid, and (ii) express one or more relationships between the plurality of data partitions; and
a solver module stored on the non-transitory computer readable medium and including instructions that, when executed by the at least one processor, cause the computing system to generate at least one solution for assigning the plurality of data partitions to the computer memory caches allocated to the plurality of virtual machines by operating on the constraint programming model using constraint programming techniques, wherein the at least one solution comprises assignments of the plurality of data partitions to the computer memory caches allocated to the plurality of virtual machines that simultaneously satisfies each of the individual constraints to: (i) balance a data load among the plurality of virtual machines by balancing quantities of data associated with the data partitions assigned to the computer memory caches allocated to the plurality of virtual machines, and (ii) balance a processing load among the plurality of virtual machines.

3. A non-transitory computer-readable medium storing computer-executable instructions that, when executed by a computing device, cause the computing device to perform functions, wherein the instructions comprise instructions for:
defining a set of constraints that limits assignment of a plurality of data partitions to computer memory caches of a plurality of virtual machines in a data grid;
generating a constraint programming model having a model solution space, the constraint programming model including: (i) the set of constraints, (ii) a set of variables representing the plurality of data partitions, and (iii) a set of values representing the computer memory caches;
transforming the constraint programming model into a plurality of constraint programming sub-models that each have reduced solution space relative to the model solution space, wherein each constraint programming sub-model includes: (i) a subset of the set of variables representing the plurality of data partitions, (ii) a subset of the set of values representing the computer memory caches, and (iii) a subset of the set of constraints; and
generating a separate solution for each of the plurality of constraint programming sub-models, wherein the separate solution for each of the plurality of constraint programming sub-models comprises a simultaneous solution to each constraint included in the subset of the set of constraints for the sub-model to assign the subset of the set of values representing the computer memory caches corresponding to the constraint programming sub-model to the subset of the set of variables representing the plurality of data partitions corresponding to the constraint programming sub-model by applying one or more constraint programming techniques.

4. The non-transitory computer-readable medium of claim 3, wherein the instructions for generating the separate solution for each of the plurality of constraint programming sub-models include instructions for generating the separate solution for each of the plurality of constraint programming sub-models sequentially.

5. The non-transitory computer-readable medium of claim 3, wherein the instructions for generating the separate solution for each of the plurality of constraint programming sub-models include instructions for generating the separate solution for each of the plurality of constraint programming sub-models in parallel.

6. The non-transitory computer-readable medium of claim 3, wherein the instructions include instructions for generating an initial solution for assigning the plurality of data partitions to the plurality of virtual machines in the data grid by applying heuristic techniques to computer representations of the plurality of data partitions and the plurality of virtual machines, wherein the initial solution does not meet every constraint in the set of constraints.

7. The non-transitory computer-readable medium of claim 3, wherein the instructions include instructions for implementing the separate solution for each of the plurality of constraint programming sub-models at least in part by storing data associated with the plurality of data partitions in the computer memory caches associated with the plurality of virtual machines in the data grid in accordance with the separate solution for each of the plurality of constraint programming sub-models.

8. The non-transitory computer-readable medium of claim 3, wherein the instructions include instructions for monitoring the data grid for unbalanced data loads among the plurality of virtual machines.

9. The non-transitory computer-readable medium of claim 3, wherein the instructions include instructions for monitoring the data grid for unbalanced processing loads among the plurality of virtual machines.

10. The non-transitory computer-readable medium of claim 3, wherein the instructions include instructions for monitoring the data grid for at least one virtual machine of the plurality of virtual machines leaving the data grid.

11. The non-transitory computer-readable medium of claim 3, wherein the instructions include instructions for monitoring the data grid for at least one additional virtual machine joining the plurality of virtual machines in the data grid.

12. The non-transitory computer-readable medium of claim 3, wherein the instructions for defining the set of constraints specify constraints that are related to one or more of:
ensuring that primary data partitions and corresponding backup data partitions of the plurality of data partitions are assigned to different failure-independent virtual machines;
balancing a data load among the plurality of virtual machines;
balancing a processing load among the plurality of virtual machines;
limiting data access times and data latency times; and
providing resiliency against single-machine and dual-machine failures.

13. The non-transitory computer-readable medium of claim 3, wherein the instructions include instructions for:

generating an analysis for each of the plurality of constraint programming sub-models by analyzing the separate solution for each of the plurality of constraint programming sub-models; and making a decision whether to implement the separate solution for each of the plurality of constraint programming sub-models in the data grid based on the analysis for each of the plurality of constraint programming sub-models.

14. The non-transitory computer-readable medium of claim 3, wherein the instructions include instructions for hosting the plurality of virtual machines on a plurality of physical machines.

15. The non-transitory computer-readable medium of claim 3, wherein the instructions include instructions for monitoring the data grid for information associated with present states of a present distribution of the plurality of data partitions among the plurality of virtual machines.

16. The non-transitory computer-readable medium of claim 15, wherein the instructions for monitoring the data grid for information associated with the present states include instructions for monitoring the data grid for information associated with one or more of:
    unbalanced data loads among the plurality of virtual machines;
    unbalanced processing loads among the plurality of virtual machines;
    at least one virtual machine of the plurality of virtual machines leaving the data grid; and
    at least one additional virtual machine joining the plurality of virtual machines in the data grid.

17. The non-transitory computer-readable medium of claim 15, wherein the instructions include instructions for:
    generating an analysis by analyzing the information associated with the present states; and
    specifying the set of constraints based at least in part on results of the analysis.

18. The non-transitory computer-readable medium of claim 17, wherein the instructions for generating the constraint programming model include instructions for generating the constraint programming model based at least in part on the results of the analysis.

19. A non-transitory computer-readable medium storing computer-executable instructions that, when executed by a computing device, cause the computing device to perform functions, wherein the instructions comprise instructions for:
    specifying a set of constraints that limits assignment of a plurality of data partitions to computer memory caches of a plurality of virtual machines in a data grid;
    generating a constraint programming model which includes the set of constraints;
    transforming the constraint programming model into a plurality of constraint programming sub-models, wherein each constraint programming sub-model includes a subset of variables representing a subset of the plurality of data partitions, a subset of values representing a subset of the computer memory caches of the plurality of virtual machines, and a subset of constraints derived from the set of constraints that limits assignment of the subset of values to the subset of variables;
    generating a solution for each of the plurality of constraint programming sub-models, wherein the solution assigns the subset of values representing the corresponding subset of the computer memory caches of the plurality of virtual machines to the subset of variables representing the corresponding subset of the corresponding plurality of data partitions by applying constraint programming techniques to the corresponding constraint programming sub-model;
    generating the solution for each of the plurality of constraint programming sub-models sequentially;
    generating a plurality of solutions for the plurality of constraint programming sub-models in parallel;
    generating an initial solution for assigning the plurality of data partitions to the plurality of virtual machines in the data grid by applying heuristic techniques to computer representations of the plurality of data partitions and the plurality of virtual machines, wherein the initial solution does not meet every constraint in the set of constraints;
    generating a first analysis for each of the plurality of constraint programming sub-models by analyzing the solution for each of the plurality of constraint programming sub-models;
    making a decision whether to implement the solution for each of the plurality of constraint programming sub-models in the data grid based on the first analysis for each of the plurality of constraint programming sub-models;
    implementing the solution for each of the plurality of constraint programming sub-models at least in part by storing data associated with the plurality of data partitions in the computer memory caches associated with the plurality of virtual machines in the data grid in accordance with the solution for each of the plurality of constraint programming sub-models;
    monitoring the data grid for unbalanced data loads among the plurality of virtual machines;
    monitoring the data grid for unbalanced processing loads among the plurality of virtual machines;
    monitoring the data grid for at least one virtual machine of the plurality of virtual machines leaving the data grid;
    monitoring the data grid for at least one additional virtual machine joining the plurality of virtual machines in the data grid;
    monitoring the data grid for information associated with present states of a present distribution of the plurality of data partitions among the plurality of virtual machines;
    generating a second analysis by analyzing the information associated with the present states;
    specifying the set of constraints based at least in part on results of the second analysis;
    generating the constraint programming model based at least in part on the results of the second analysis; and
    hosting the plurality of virtual machines on a plurality of physical machines,
    wherein the instructions for specifying the set of constraints specify constraints that are related to one or more of:
        ensuring that primary data partitions and corresponding backup data partitions of the plurality of data partitions are assigned to different failure-independent virtual machines,
        balancing a data load among the plurality of virtual machines,
        balancing a processing load among the plurality of virtual machines,
        limiting data access times and data latency times, and
        providing resiliency against single-machine and dual-machine failures, and wherein the instructions for generating the constraint programming model include instructions for generating:
  a set of variables representing the plurality of data partitions, and
  a set of values representing the plurality of virtual machines.

* * * * *